(12) United States Patent  
Ishak

(10) Patent No.: US 6,984,038 B2
(45) Date of Patent: Jan. 10, 2006

(54) WATERMAN'S SUNGLASS LENS

(76) Inventor: Andrew Ishak, 920 Revolution St., Havre de Grace, MD (US) 21078

( * ) Notice: Subject to any disclaimer, the term of this patent is extended or adjusted under 35 U.S.C. 154(b) by 31 days.

(21) Appl. No.: 10/849,506

(22) Filed: May 19, 2004

(65) Prior Publication Data

US 2005/0007548 A1    Jan. 13, 2005

Related U.S. Application Data

(62) Division of application No. 10/000,062, filed on Nov. 2, 2001, now abandoned.

(60) Provisional application No. 60/245,304, filed on Nov. 3, 2000, provisional application No. 60/266,497, filed on Feb. 5, 2001.

(51) Int. Cl.
G02C 7/10 (2006.01)
G02C 7/12 (2006.01)

(52) U.S. Cl. .......................... 351/163; 351/44; 351/49
(58) Field of Classification Search ................ 351/159, 351/163–166, 41, 44, 45, 49
See application file for complete search history.

(56) References Cited

U.S. PATENT DOCUMENTS 4,878,748 A * 11/1989 Johansen et al. ............. 351/44
5,702,819 A * 12/1997 Gupta et al. ................. 428/412
6,145,984 A * 11/2000 Farwig ......................... 351/49
6,220,703 B1 * 4/2001 Evans et al. ................. 351/163
6,334,680 B1 * 1/2002 Larson ......................... 351/159

OTHER PUBLICATIONS

Willard et al., Instrumental Methods of Analysis, 6th Edition, 1981, pp. 67-68.*
NACL website, as archived from Oct. 8, 2000: http://web.archive.org/web/20001008003354/http://www.nacl.com/custom.htm obtained for WayBack Machine at www.archive.org.*

* cited by examiner

Primary Examiner—Scott J. Sugarman
(74) Attorney, Agent, or Firm—Law Offices of Royal W. Craig

(57) ABSTRACT

An improved ten-layer performance polarized lens for sunglasses. The lens design maximizes the benefit to watermen, giving them a combination of outer hydrophobic overcoat to protect the lens from seawater and smudging, multi-layer dielectric mirror which further reduces glare and overall light transmission, two layers of high-contrast blue-blocking amber or color-discriminating grey ophthalmic CR-39™ plastic or polycarbonate, sandwiching a polarizing layer. The foregoing layers are arranged to provide a balanced light transmission profile optimum for use on the water in which 100% of UV-A & B light is absorbed to at least 400 nm. An alternative embodiment is described in which a Rugate filter is incorporated in place of or in addition to the multi-layer dielectric mirror. The resulting watermens' dielectric-mirrored sunglass lens reduces both overall light transmission and ocular photochemical damage, and is available in either high-contrast blue-light blocking amber or grey coloration.

11 Claims, 12 Drawing Sheets

Spectral Analysis

| | TRANS | x | y |
|---|---|---|---|
| Illuminate C Photopic | 7.92% | 0.2696 | 0.3023 |
| Illuminate D65 | 7.92% | | |
| Illuminate A | 7.44% | | |
| Illuminate C Scotopic | 9.79% | | |
| Average Blue Light | 6.64% | | |
| UVA | 0.00% | | |
| UVB | 0.00% | | |

| nm | %T | nm | %T |
|---|---|---|---|
| 300 | 0.00 | 550 | 8.16 |
| 310 | 0.00 | 560 | 7.98 |
| 320 | 0.00 | 570 | 7.68 |
| 330 | 0.00 | 580 | 7.14 |
| 340 | 0.00 | 590 | 6.64 |
| 350 | 0.00 | 600 | 6.27 |
| 360 | 0.00 | 610 | 5.98 |
| 370 | 0.00 | 620 | 5.73 |
| 380 | 0.00 | 630 | 5.57 |
| 390 | 0.00 | 640 | 5.58 |
| 400 | 0.06 | 650 | 5.78 |
| 410 | 0.93 | 660 | 6.11 |
| 420 | 3.05 | 670 | 6.51 |
| 430 | 5.26 | 680 | 8.96 |
| 440 | 7.77 | 690 | 7.40 |
| 450 | 10.05 | 700 | 7.82 |
| 460 | 11.74 | 710 | 8.28 |
| 470 | 12.76 | 720 | 8.72 |
| 480 | 13.30 | 730 | 9.17 |
| 490 | 13.27 | 740 | 9.67 |
| 500 | 8.06 | 750 | 10.15 |
| 510 | 8.49 | 760 | 10.63 |
| 520 | 8.88 | 770 | 11.10 |
| 530 | 8.75 | 780 | 11.50 |
| 540 | 8.40 | 790 | 11.83 |

ANSI Z80.3

| | Red | Yellow | Green | D65 |
|---|---|---|---|---|
| TRANS | 5.82% | 6.90% | 8.55% | 7.92% |
| TEST | Fail | Fail | Fail | |
| X | | 6.00 | 0.93 | 7.23 |
| Y | 0.83 | 4.72 | 1.85 | 8.37 |
| Z | | 0.02 | 2.21 | 10.99 |
| x | | 0.5589 | 0.1869 | 0.2719 |
| y | | 0.4396 | 0.3706 | 0.3148 |
| Chromaticity | | Pass | Pass | Pass |

This is a SPECIAL PURPOSE LENS

CEN 94

| | Red | Yellow | Green | Blue |
|---|---|---|---|---|
| TRANS | 5.95% | 6.85% | 8.54% | 9.13% |
| Q | 0.75 | 0.87 | 1.06 | 1.15 |
| TEST | Fail | Pass | Pass | Pass |

This is a FILTER CATEGORY 4

| | Max | Test | Delta |
|---|---|---|---|
| T(280-315) | 0.00 | Pass | 0.79 |
| T(315-350) | 0.00 | Pass | 3.96 |
| SOLAR UVA | 0.00 | Pass | 3.96 |

AUSTRALIAN STANDARDS

| | Red | Violet |
|---|---|---|
| FACTOR | 0.73 | 0.93 |

This is a SPECIFIC

FAIL  FAIL

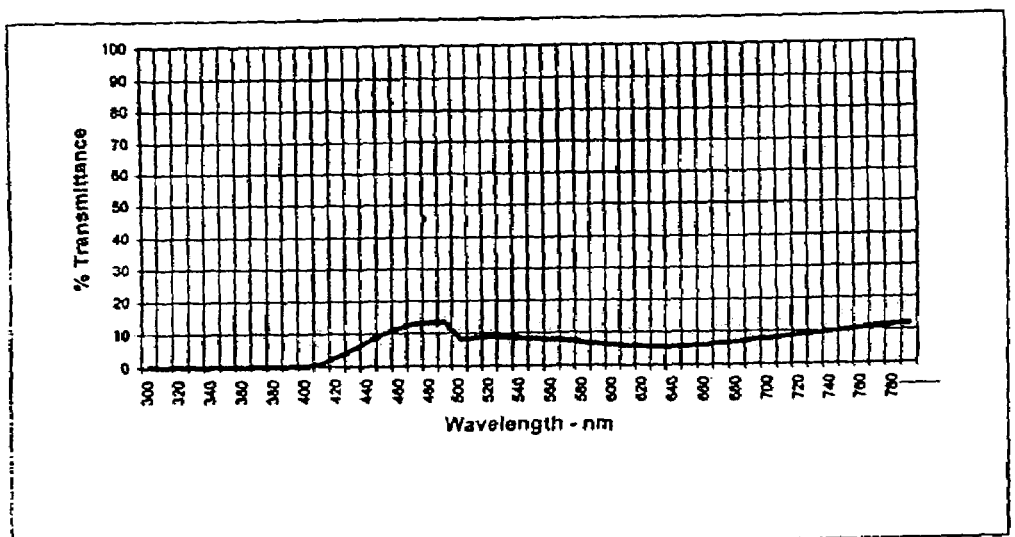

FIG. 2

For Test: Definition - ANSI Z87.1
COLTS Control Number: Z-BZS031601-02-01

| Lens Sample Group Description |||
|---|---|---|
| Lens Samples | Substrate (Lens Material) | Coatings (Hard Coat, AR, etc) |
| One Lens Sample Group | Lens Material: unk | Type: Polarized |
| Manufacturer: Bayz | Index of Refraction: | Comments: |
| Lens Type: FSV | Lens Density: | Polarized / Grey |
| Requested By: DR. Ishak | Report valid thru: 09/16/01 | |

| Test Number | Definition | Pass/Fail |
|---|---|---|
| Z-BZS031601-02-01-01 | 28 | Pass |
| Z-BZS031601-02-01-02 | 34 | Pass |
| Z-BZS031601-02-01-03 | 34 | Pass |

ANSI Z87.1 Requirement
Pattern 20 in both directions

FIG. 2A

Spectral Analysis

|  | TRANS | x | y |
|---|---|---|---|
| Illuminate C Photopic | 9.91% | 0.2685 | 0.3050 |
| Illuminate D65 | 9.91% | | |
| Illuminate A | 9.27% | | |
| Illuminate C Scotopic | 12.34% | | |
| Average Blue Light | 8.46% | | |
| UVA | 0.00% | | |
| UVB | 0.00% | | |

| nm | %T | nm | %T |
|---|---|---|---|
| 300 | 0.00 | 550 | 10.27 |
| 310 | 0.00 | 560 | 9.98 |
| 320 | 0.00 | 570 | 9.46 |
| 330 | 0.00 | 580 | 8.67 |
| 340 | 0.00 | 590 | 8.01 |
| 350 | 0.00 | 600 | 7.56 |
| 360 | 0.00 | 610 | 7.19 |
| 370 | 0.00 | 620 | 6.86 |
| 380 | 0.00 | 630 | 6.75 |
| 390 | 0.00 | 640 | 7.02 |
| 400 | 0.05 | 650 | 7.68 |
| 410 | 0.95 | 660 | 8.53 |
| 420 | 3.41 | 670 | 9.38 |
| 430 | 6.13 | 680 | 10.17 |
| 440 | 9.33 | 690 | 10.82 |
| 450 | 12.37 | 700 | 11.37 |
| 460 | 14.65 | 710 | 11.90 |
| 470 | 16.06 | 720 | 12.38 |
| 480 | 16.74 | 730 | 12.87 |
| 490 | 15.69 | 740 | 13.37 |
| 500 | 10.41 | 750 | 13.84 |
| 510 | 10.92 | 760 | 14.31 |
| 520 | 11.36 | 770 | 14.77 |
| 530 | 11.13 | 780 | 15.15 |
| 540 | 10.82 | 790 | 15.47 |

ANSI Z80.3

|  | Red | Yellow | Green | D65 |
|---|---|---|---|---|
| TRANS | 7.43% | 8.52% | 10.79% | 9.91% |
| TEST | Fail | Pass | Pass | |
| X | | 7.41 | 1.16 | 8.92 |
| Y | 0.81 | 5.83 | 2.34 | 10.48 |
| Z | | 0.02 | 2.75 | 13.59 |
| x | | 0.5590 | 0.1854 | 0.2704 |
| y | | 0.4394 | 0.3741 | 0.3176 |
| Chromiticity | | Pass | Pass | Pass |

This is a GENERAL PURPOSE LENS

CEN 84

|  | Red | Yellow | Green | Blue |
|---|---|---|---|---|
| TRANS | 7.39% | 8.50% | 10.76% | 11.64% |
| Q | 0.75 | 0.86 | 1.09 | 1.17 |
| TEST | Fail | Pass | Pass | Pass |

This is a FILTER CATEGORY 3

|  | Max | Test | Delta |
|---|---|---|---|
| T(280-315) | 0.00 | Pass | 0.99 |
| T(316-350) | 0.00 | Pass | 4.96 |
| SOLAR UVA | 0.00 | Pass | 4.96 |

AUSTRALIAN STANDARDS

|  | Red | Violet |
|---|---|---|
| FACTOR | 0.73 | 0.81 |

This is a GENERAL PURPOSE SUNGLASS
FAIL    PASS

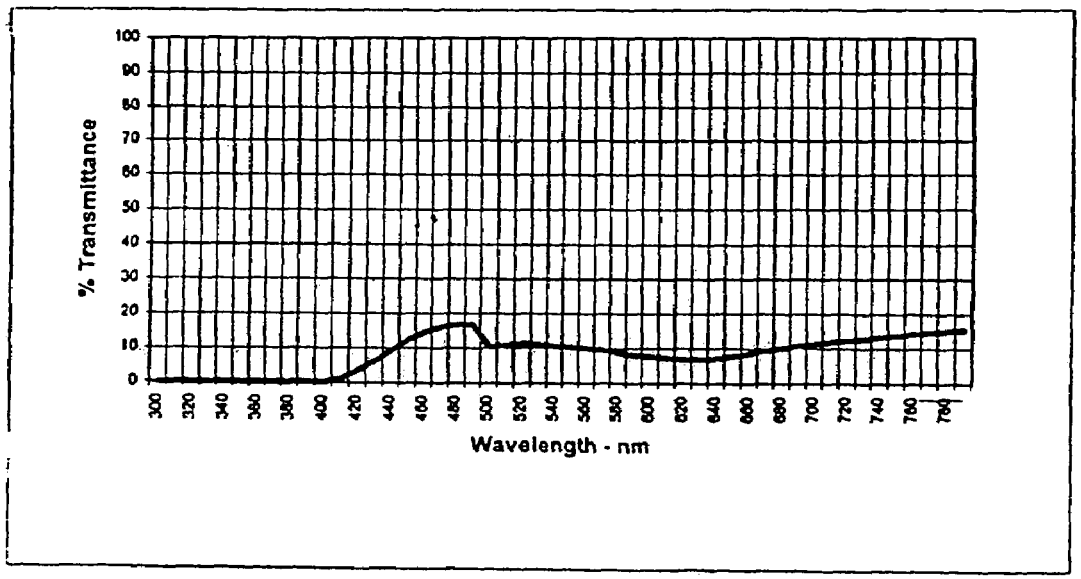

FIG. 3

Spectral Analysis

|  | TRANS | x | y |
|---|---|---|---|
| Illuminate C Photopic | 7.66% | 0.4603 | 0.4827 |
| Illuminate D65 | 7.81% | | |
| Illuminate A | 8.52% | | |
| Illuminate C Scotopic | 2.96% | | |
| Average Blue Light | 0.34% | | |
| UVA | 0.00% | | |
| UVB | 0.00% | | |

| nm | %T | nm | %T |
|---|---|---|---|
| 300 | 0.00 | 550 | 8.54 |
| 310 | 0.00 | 560 | 9.83 |
| 320 | 0.00 | 570 | 10.59 |
| 330 | 0.00 | 580 | 10.73 |
| 340 | 0.00 | 590 | 10.49 |
| 350 | 0.00 | 600 | 10.15 |
| 360 | 0.00 | 610 | 9.77 |
| 370 | 0.00 | 620 | 9.46 |
| 380 | 0.00 | 630 | 9.20 |
| 390 | 0.00 | 640 | 9.00 |
| 400 | 0.01 | 650 | 8.87 |
| 410 | 0.11 | 660 | 8.83 |
| 420 | 0.30 | 670 | 8.86 |
| 430 | 0.37 | 680 | 8.98 |
| 440 | 0.38 | 690 | 9.15 |
| 450 | 0.36 | 700 | 9.38 |
| 460 | 0.35 | 710 | 9.68 |
| 470 | 0.36 | 720 | 10.01 |
| 480 | 0.48 | 730 | 10.37 |
| 490 | 0.86 | 740 | 10.77 |
| 500 | 1.09 | 750 | 11.17 |
| 510 | 2.33 | 760 | 11.56 |
| 520 | 4.19 | 770 | 11.97 |
| 530 | 5.87 | 780 | 12.31 |
| 540 | 7.23 | 790 | 12.58 |

ANSI Z80.3

|  | Red | Yellow | Green | D65 |
|---|---|---|---|---|
| TRANS | 9.14% | 9.79% | 6.31% | 7.61% |
| TEST | Fail | Fail | Fail | |
| X | | 9.11 | 0.75 | 7.90 |
| Y | 0.99 | 8.59 | 1.37 | 8.04 |
| Z | | 0.02 | 0.13 | 0.59 |
| x | | 0.5758 | 0.3352 | 0.4779 |
| y | | 0.4232 | 0.6063 | 0.4866 |
| Chromaticity | | Pass | Pass | Pass |

This is a SPECIAL PURPOSE LENS

CEN 94

|  | Red | Yellow | Green | Blue |
|---|---|---|---|---|
| TRANS | 9.57% | 9.76% | 6.31% | 4.38% |
| Q | 1.26 | 1.28 | 0.83 | 0.58 |
| TEST | Pass | Pass | Pass | Fail |

This is a FILTER CATEGORY 4

|  | Max | Test | Delta |
|---|---|---|---|
| T(280-315) | 0.00 | Pass | 0.76 |
| T(316-350) | 0.00 | Pass | 3.81 |
| SOLAR UVA | 0.00 | Pass | 3.81 |

AUSTRALIAN STANDARDS

|  | Red | Violet |
|---|---|---|
| FACTOR | 1.20 | 0.04 |
| This is a | SPECIFIC | |
| | FAIL | FAIL |

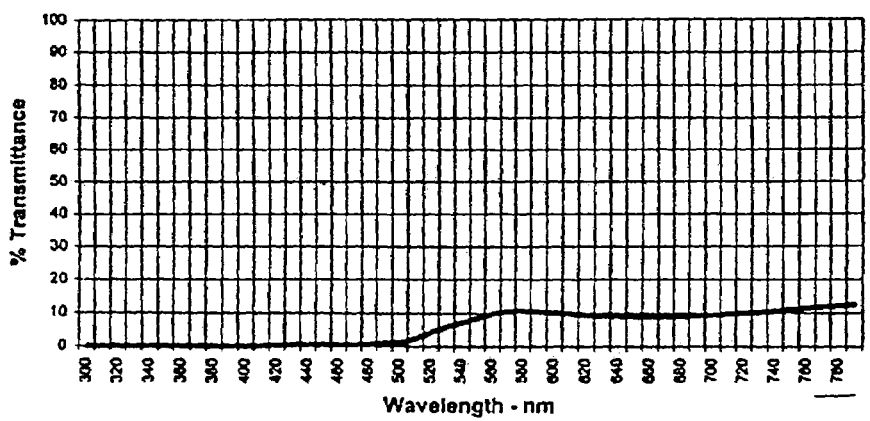

O-VIA012901-04-01 (Amber Mirror)

FIG. 4

For Test: Definition - ANSI Z87.1

| Lens Sample Group Description |||
|---|---|---|
| Lens Samples | Substrate (Lens Material) | Coatings (Hard Coat, AR, etc) |
| One Lens Sample Group Lens Material: unk | Type: Polarized |
| Manufacturer: Bayz | Index of Refraction: | Comments: |
| Lens Type: FSV | Lens Density: | Polarized / Amber |
| Requested By: DR. Ishak | Report valid thru: 09/16/01 | |

| Test Number | Definition | Pass/Fail |
|---|---|---|
| Z-BZS031601-01-01-01 | 20 | Pass |
| Z-BZS031601-01-01-02 | 34 | Pass |
| Z-BZS031601-01-01-03 | 34 | Pass |

<u>ANSI Z87.1 Requirement</u>
Pattern 20 in both directions

FIG. 4A

Spectral Analysis

| | TRANS | x | y |
|---|---|---|---|
| Illuminate C Photopic | 9.91% | 0.4766 | 0.4822 |
| Illuminate D65 | 9.85% | | |
| Illuminate A | 10.99% | | |
| Illuminate C Scotopic | 3.94% | | |
| Average Blue Light | 0.51% | | |
| UVA | 0.00% | | |
| UVB | 0.00% | | |

| nm | %T | nm | %T |
|---|---|---|---|
| 300 | 0.00 | 550 | 11.10 |
| 310 | 0.00 | 560 | 12.64 |
| 320 | 0.00 | 570 | 13.52 |
| 330 | 0.00 | 580 | 13.66 |
| 340 | 0.00 | 590 | 13.37 |
| 350 | 0.00 | 600 | 12.96 |
| 360 | 0.00 | 610 | 12.52 |
| 370 | 0.00 | 620 | 12.15 |
| 380 | 0.00 | 630 | 11.83 |
| 390 | 0.00 | 640 | 11.60 |
| 400 | 0.01 | 650 | 11.45 |
| 410 | 0.17 | 660 | 11.40 |
| 420 | 0.44 | 670 | 11.43 |
| 430 | 0.55 | 680 | 11.55 |
| 440 | 0.55 | 690 | 11.75 |
| 450 | 0.53 | 700 | 11.99 |
| 460 | 0.52 | 710 | 12.31 |
| 470 | 0.53 | 720 | 12.66 |
| 480 | 0.72 | 730 | 13.04 |
| 490 | 1.28 | 740 | 13.45 |
| 500 | 1.52 | 750 | 13.84 |
| 510 | 3.20 | 760 | 14.23 |
| 520 | 5.63 | 770 | 14.62 |
| 530 | 7.81 | 780 | 14.92 |
| 540 | 9.52 | 790 | 15.16 |

ANSI Z80.3

| | Red | Yellow | Green | D65 |
|---|---|---|---|---|
| TRANS | 11.76% | 12.56% | 8.24% | 9.85% |
| TEST | Pass | Pass | Pass | |
| X | | 11.87 | 0.97 | 10.15 |
| Y | 1.28 | 8.58 | 1.78 | 10.41 |
| Z | | 0.02 | 0.19 | 0.84 |
| x | | 0.5756 | 0.3308 | 0.4742 |
| y | | 0.4233 | 0.6054 | 0.4883 |
| Chromiticity | | Pass | Pass | Pass |

This is a GENERAL PURPOSE LENS

CEN 94

| | Red | Yellow | Green | Blue |
|---|---|---|---|---|
| TRANS | 12.27% | 12.52% | 8.25% | 5.77% |
| Q | 1.25 | 1.27 | 0.84 | 0.59 |
| TEST | Pass | Pass | Pass | Fail |

This is a FILTER CATEGORY 3

| | Max | Test | Delta |
|---|---|---|---|
| T(280-315) | 0.00 | Pass | 0.98 |
| T(315-350) | 0.00 | Pass | 4.92 |
| SOLAR UVA | 0.00 | Pass | 4.92 |

AUSTRALIAN STANDARDS

| | Red | Violet |
|---|---|---|
| FACTOR | 1.19 | 0.05 |

This is a GENERAL PURPOSE SUNGLASS
FAIL    FAIL

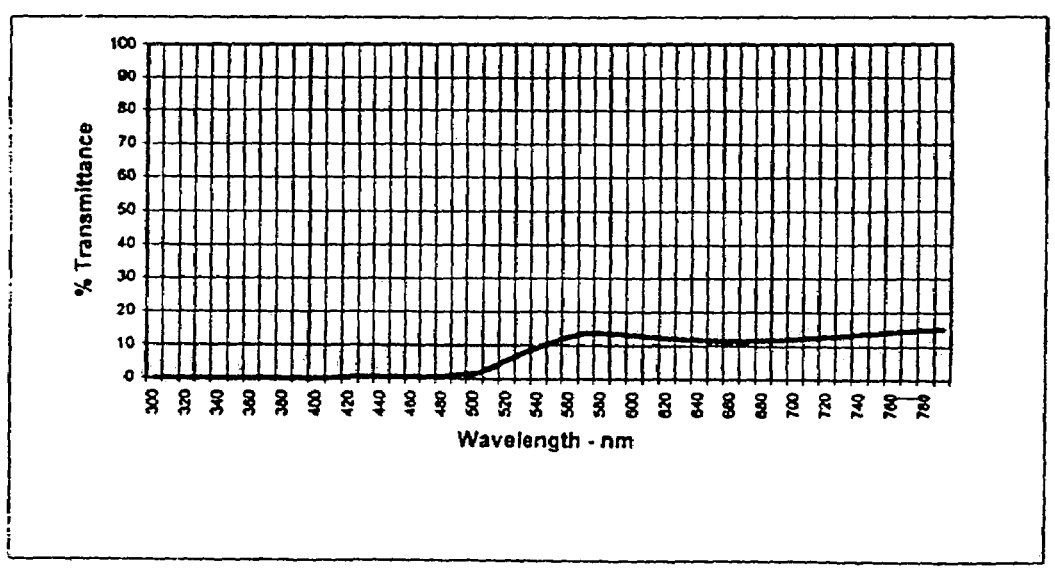

FIG. 5

Spectral Analysis

| | TRANS | x | y |
|---|---|---|---|
| Illuminate C Photopic | 17.80% | 0.4369 | 0.4180 |
| Illuminate D65 | 17.68% | | |
| Illuminate A | 19.69% | | |
| Illuminate C Scotopic | 10.41% | | |
| Average Blue Light | 4.90% | | |
| UVA | 0.00% | | |
| UVB | 0.00% | | |

| nm | %T | nm | %T |
|---|---|---|---|
| 300 | 0.00 | 550 | 15.34 |
| 310 | 0.00 | 560 | 20.06 |
| 320 | 0.00 | 570 | 22.41 |
| 330 | 0.00 | 580 | 23.37 |
| 340 | 0.00 | 590 | 23.80 |
| 350 | 0.00 | 600 | 24.11 |
| 360 | 0.12 | 610 | 24.62 |
| 370 | 0.63 | 620 | 24.90 |
| 380 | 1.07 | 630 | 25.05 |
| 390 | 2.81 | 640 | 25.13 |
| 400 | 3.78 | 650 | 25.42 |
| 410 | 3.61 | 660 | 25.98 |
| 420 | 3.28 | 670 | 26.75 |
| 430 | 3.23 | 680 | 27.87 |
| 440 | 3.41 | 690 | 28.37 |
| 450 | 4.19 | 700 | 28.82 |
| 460 | 5.26 | 710 | 29.03 |
| 470 | 6.45 | 720 | 29.05 |
| 480 | 7.58 | 730 | 28.95 |
| 490 | 8.57 | 740 | 28.74 |
| 500 | 12.08 | 750 | 28.49 |
| 510 | 13.35 | 760 | 28.20 |
| 520 | 13.17 | 770 | 27.83 |
| 530 | 11.59 | 780 | 27.54 |
| 540 | 11.46 | 790 | 27.25 |

ANSI Z80.3

| | Red | Yellow | Green | D65 |
|---|---|---|---|---|
| TRANS | 25.38% | 22.35% | 14.76% | 17.68% |
| TEST | Pass | Pass | Pass | |
| X | | 22.21 | 1.72 | 19.23 |
| Y | 2.76 | 15.27 | 3.20 | 18.69 |
| Z | | 0.03 | 1.30 | 6.12 |
| x | | 0.5920 | 0.2768 | 0.4367 |
| y | | 0.4072 | 0.5137 | 0.4244 |
| Chromaticity | | Pass | Pass | Pass |

This is a GENERAL PURPOSE LENS

CEN 94

| | Red | Yellow | Green | Blue |
|---|---|---|---|---|
| TRANS | 24.83% | 22.41% | 14.63% | 13.53% |
| Q | 1.40 | 1.27 | 0.83 | 0.77 |
| TEST | Pass | Pass | Pass | Fail |

This is a FILTER CATEGORY 3

| | Max | Test | Delta |
|---|---|---|---|
| T(280-315) | 0.00 | Pass | 1.77 |
| T(316-350) | 0.00 | Pass | 8.84 |
| SOLAR UVA | 0.00 | Pass | 8.84 |

AUSTRALIAN STANDARDS

| | Red | Violet |
|---|---|---|
| FACTOR | 1.42 | 0.24 |

This is a GENERAL PURPOSE SUNGLASS
PASS     FAIL

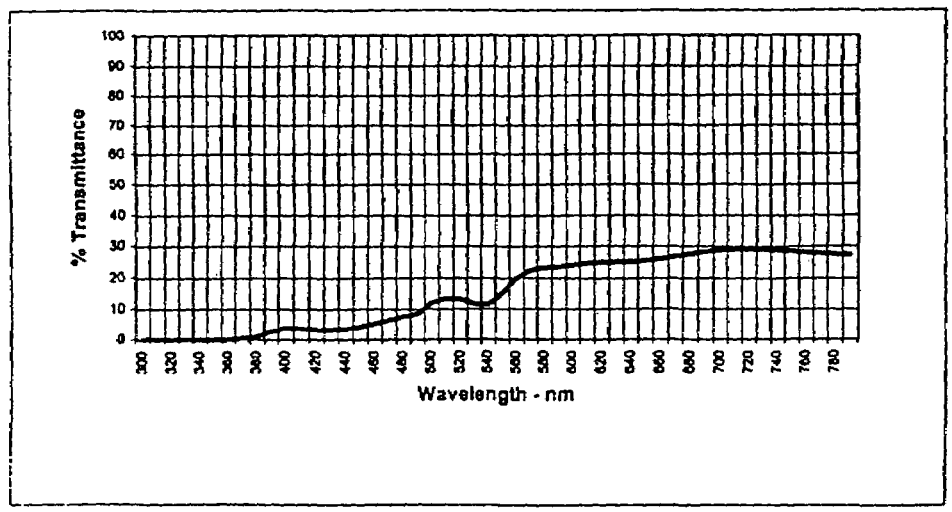

O-BZS030701-01-01 (Ray Ban Daddy O)

FIG. 6

Spectral Analysis

|  | TRANS | x | y |
|---|---|---|---|
| Iluminate C Photopic | 24.30% | 0.5425 | 0.4364 |
| Iluminate D65 | 23.97% | | |
| Iluminate A | 29.70% | | |
| Iluminate C Scotopic | 6.40% | | |
| Average Blue Light | 0.85% | | |
| UVA | 0.01% | | |
| UVB | 0.00% | | |

| nm | %T | nm | %T |
|---|---|---|---|
| 300 | 0.00 | 550 | 20.05 |
| 310 | 0.00 | 560 | 24.55 |
| 320 | 0.00 | 570 | 30.48 |
| 330 | 0.01 | 580 | 38.21 |
| 340 | 0.02 | 590 | 43.60 |
| 350 | 0.02 | 600 | 44.90 |
| 360 | 0.02 | 610 | 46.00 |
| 370 | 0.04 | 620 | 46.28 |
| 380 | 0.16 | 630 | 47.00 |
| 390 | 0.44 | 640 | 46.23 |
| 400 | 0.70 | 650 | 44.91 |
| 410 | 0.62 | 660 | 45.28 |
| 420 | 0.50 | 670 | 48.40 |
| 430 | 0.51 | 680 | 55.47 |
| 440 | 0.57 | 690 | 64.74 |
| 450 | 0.73 | 700 | 73.63 |
| 460 | 0.89 | 710 | 81.96 |
| 470 | 0.96 | 720 | 85.52 |
| 480 | 1.12 | 730 | 88.83 |
| 490 | 1.62 | 740 | 89.54 |
| 500 | 2.88 | 750 | 90.06 |
| 510 | 3.40 | 760 | 90.94 |
| 520 | 4.76 | 770 | 90.55 |
| 530 | 9.19 | 780 | 91.03 |
| 540 | 15.54 | 790 | 91.27 |

ANSI Z80.3

|  | Red | Yellow | Green | D65 |
|---|---|---|---|---|
| TRANS | 47.16% | 37.12% | 15.31% | 23.97% |
| TEST | Pass | Pass | Pass | |
| X | | 39.24 | 2.32 | 31.29 |
| Y | 5.13 | 25.37 | 3.32 | 25.33 |
| Z | | 0.04 | 0.26 | 1.16 |
| x | | 0.6069 | 0.3938 | 0.5414 |
| y | | 0.3924 | 0.5620 | 0.4382 |
| Chromiticity | | Pass | Pass | Pass |

This is a GENERAL PURPOSE LENS

CEN 94

|  | Red | Yellow | Green | Blue |
|---|---|---|---|---|
| TRANS | 46.19% | 37.35% | 14.95% | 12.84% |
| Q | 1.93 | 1.56 | 0.62 | 0.54 |
| TEST | Pass | Pass | Fail | Fail |

This is a FILTER CATEGORY 2

|  | Max | Test | Delta |
|---|---|---|---|
| T(280-315) | 0.00 | Pass | 2.40 |
| T(316-350) | 0.00 | Pass | 11.96 |
| SOLAR UVA | 0.00 | Pass | 11.96 |

AUSTRALIAN STANDARDS

|  | Red | Violet |
|---|---|---|
| FACTOR | 1.93 | 0.03 |

This is a GENERAL PURPOSE SUNGLASS
PASS FAIL

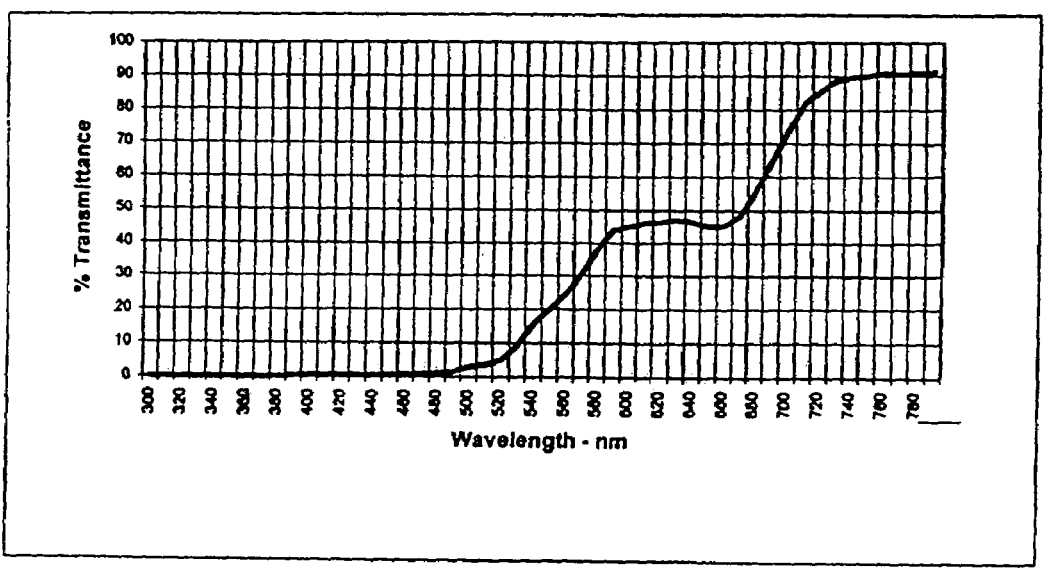

O-BZS030701-02-01 (BluBlocker 1870)

FIG. 7

Spectral Analysis

| | TRANS | x | y |
|---|---|---|---|
| Illuminate C Photopic | 12.83% | 0.4465 | 0.4204 |
| Illuminate D65 | 12.74% | | |
| Illuminate A | 14.34% | | |
| Illuminate C Scotopic | 7.18% | | |
| Average Blue Light | 2.58% | | |
| UVA | 0.00% | | |
| UVB | 0.00% | | |

| nm | %T | | nm | %T |
|---|---|---|---|---|
| 300 | 0.00 | | 550 | 10.46 |
| 310 | 0.00 | | 560 | 12.93 |
| 320 | 0.00 | | 570 | 15.91 |
| 330 | 0.00 | | 580 | 18.08 |
| 340 | 0.00 | | 590 | 18.66 |
| 350 | 0.00 | | 600 | 18.50 |
| 360 | 0.00 | | 610 | 18.16 |
| 370 | 0.00 | | 620 | 17.89 |
| 380 | 0.00 | | 630 | 17.72 |
| 390 | 0.00 | | 640 | 17.78 |
| 400 | 0.00 | | 650 | 18.26 |
| 410 | 0.04 | | 660 | 19.25 |
| 420 | 0.23 | | 670 | 20.68 |
| 430 | 0.66 | | 680 | 22.51 |
| 440 | 1.63 | | 690 | 24.44 |
| 450 | 3.07 | | 700 | 26.52 |
| 460 | 4.48 | | 710 | 28.97 |
| 470 | 5.36 | | 720 | 31.41 |
| 480 | 5.72 | | 730 | 34.13 |
| 490 | 5.89 | | 740 | 37.26 |
| 500 | 7.66 | | 750 | 40.38 |
| 510 | 7.93 | | 760 | 43.65 |
| 520 | 8.32 | | 770 | 47.20 |
| 530 | 8.77 | | 780 | 50.53 |
| 540 | 9.30 | | 790 | 53.60 |

ANSI Z80.3

| | Red | Yellow | Green | D65 |
|---|---|---|---|---|
| TRANS | 18.45% | 16.40% | 10.37% | 12.74% |
| TEST | Pass | Pass | Pass | |
| X | | 16.43 | 1.25 | 14.10 |
| Y | 2.01 | 11.21 | 2.25 | 13.46 |
| Z | | 0.02 | 0.91 | 4.06 |
| x | | 0.5939 | 0.2836 | 0.4459 |
| y | | 0.4053 | 0.5096 | 0.4258 |
| Chromiticity | | Pass | Pass | Pass |

This is a GENERAL PURPOSE LENS

CEN 94

| | Red | Yellow | Green | Blue |
|---|---|---|---|---|
| TRANS | 18.36% | 16.47% | 10.26% | 9.56% |
| Q | 1.44 | 1.29 | 0.81 | 0.75 |
| TEST | Pass | Pass | Pass | Fail |

This is a FILTER CATEGORY 3

| | Max | Test | Delta |
|---|---|---|---|
| T(280-315) | 0.00 | Pass | 1.27 |
| T(315-350) | 0.00 | Pass | 6.37 |
| SOLAR UVA | 0.00 | Pass | 6.37 |

AUSTRALIAN STANDARDS

| | Red | Violet |
|---|---|---|
| FACTOR | 1.42 | 0.18 |

This is a GENERAL PURPOSE SUNGLASS
PASS    FAIL

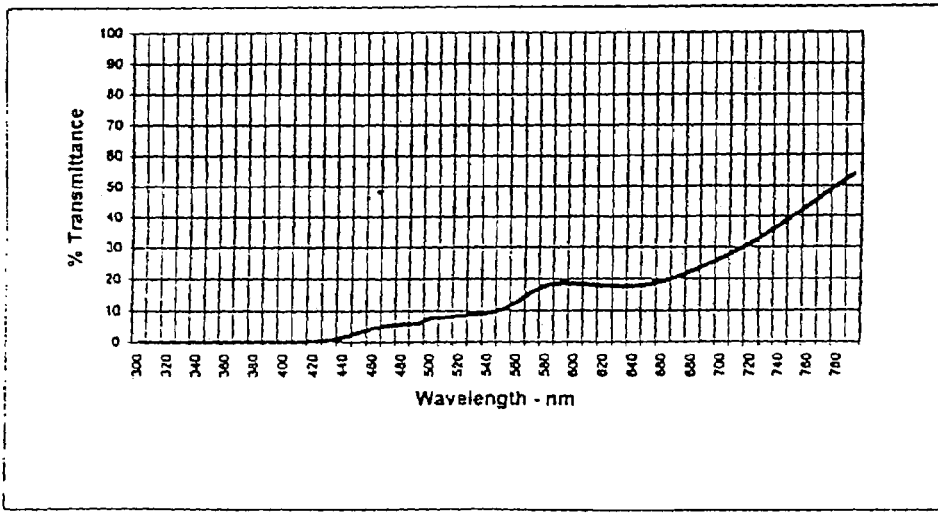

O-BZS030701-03-01 (Costa Del Mar Islamorada)

FIG. 8

WATERMAN'S SUNGLASS LENS

CROSS-REFERENCE TO RELATED APPLICATIONS

The present application is a division of U.S. patent application Ser. No. 10/000,062; filed: Nov. 2, 2001, now abandoned, which in turn derives priority from U.S. Provisional Patent Application Nos. 60/245,304 and 60/266,497, both for "WATERMAN'S SUNGLASS LENS", filed: Nov. 3, 2000 and Feb. 5, 2001, respectively.

BACKGROUND OF THE INVENTION

1. Field of the Invention

The present invention relates to sunglasses and, more particularly, to an improved multi-layer lightweight CR-39™, polarized, dielectric-mirrored sunglass lens specifically designed for watermen, to reduce both overall light transmission and ocular photochemical damage, available in either high-contrast blue-light blocking amber or grey coloration.

2. Description of the Background

Quality polarized sunglasses have evolved to the point where they often incorporate numerous layers and coatings all of which combine to provide a particular light transmission profile. The efficacy of each layer affects that of each subsequent layer, and a good design effort often involves the balancing of numerous optical constraints in pursuit of a synergistic result. The most useful balance for outdoor enthusiasts such as watermen is a lens having a patterned absorption profile over a broad spectral range. More specifically, the lens should absorb higher energy light more strongly than lower energy light, e.g., more UV light than blue, more blue than green, etc.

Ultraviolet radiation falls within a range of wavelengths below visible light, generally between 100 and 400 nanometers. Long UVA radiation occurs at wavelengths between 315 and 400 nanometers. UVB radiation occurs between 280 and 315 nanometers. UVC radiation occurs between 200 and 280 nanometers. Wavelengths between 100 and 200 nanometers are known as vacuum UV. Vacuum UV and UVC are the most harmful to humans, but the earth's ozone layer tends to block these types of ultraviolet radiation. Nevertheless, the occurrence of ocular injury from ultraviolet exposure has increased dramatically over the past few years, and this is thought to be a result of ozone layer depletion. Given current efforts to restore the ozone layer, it is optimistically predicted to reach original levels by the year 2050. Others speculate that the developing black markets for ozone-depleting agents such as CFC refrigerant will add further delay. Bergmanson et al., *Practicing Preventative Eye Care With UV-Blocking Eye Wear*, Contact Lens Spectrum (February 1998).

According to Prevent Blindness America, the American Academy of Ophthalmology, and the American Optometric Association, "Ultraviolet radiation can play a contributory role in the development of various eye disorders including age-related cataract, pterygium (growth of tissue from the white of the eye onto the cornea), cancer of the skin around the eye, photokeratitis (sunburn of the cornea) and corneal degeneration." Cataracts are a major cause of visual impairment and blindness worldwide. "We've found there is no safe dose of UV-B exposure when it comes to risk of cataract, which means people of all ages, races and both sexes should protect their eyes from sunlight year-round." Infeld, Karen, *Sunlight Poses Universal Cataract Risk*, Johns Hopkins Study, http://www.eurekalert.org/releases/jhu-sunposcat.html (1998).

Age-related macular degeneration (AMD) is the leading cause of blind registration in the western world, and its prevalence is likely to rise as a consequence of increasing longevity. Beatty et al., *The Role of Oxidative Stress in the Pathogenesis of Age-Related Macular Degeneration*, Survey of Ophthalmology, volume 45, no. 2 (September-October 2000). Macular pigment is also believed to limit retinal oxidative damage by absorbing incoming blue light and/or quenching reactive oxygen intermediates. Many putative risk factors for AMD have been linked to the lack of macular pigment, including female gender, lens density, tobacco use, light iris color, and reduced visual sensitivity. The absorbency spectrum of macular pigment peaks at 460 nm (Id at 165), and it has been calculated that carotenoids reduce the amount of blue light incident on the photoreceptors of the fovea by approximately 40%.

The incidence of visible blue light exposure is a contributing cause of AMD. Photochemical retinal injury in monkeys from visible blue light (441 nm) was shown by Ham et al., "Histologic Analysis of Photochemical Lesions Produced in Rhesus Retina by Short-wave-length Light", Invest Ophthalmol Vis Sci 17:1029–35 (1978). It was found that short-wavelength light resulted in damage to the photoreceptor outer segments, cellular proliferation, and other symptoms which resembled changes seen in AMD. It was reported that the power required to cause such damage was 70 to 1000 times lower for blue light (441.6 nm) than for infrared wavelengths (1064 nm) based on exposure times ranging from 1 to 100 seconds. This was confirmed by Wu et al. who showed that the mechanism of blue light induced cell death is apoptosis. Wu J et al., "Blue Light Induced Apoptosis in Rat Retina", Eye 13:577–83 (1999). Moreover, the ten-year Beaver Dam Eye Study was recently completed and is reviewed in the Arch Ophthalmology, vol. 122, p. 754–757 (May 2004). This study proves a direct correlation between the incidence of blue light and AMD but no association between UVA and UVB light and AMD.

As the entire population is potentially exposed to sunlight, the odds ratio of 13.6 and 2.19 for high exposure to visible blue light and AMD represent quite robust evidence in support of the sunlight/AMD hypothesis. Consequently, a sunlens that dramatically reduces visible blue light combined with a high degree of UVA and UVB protection will preserve visual function.

The Food and Drug Administration recommends that all sunglasses, prescription or non-prescription, block 99% of UVB and 95% of UVA. Most sunglasses on the market meet these criteria. Indeed, there are sunglasses for outdoor enthusiasts that can achieve 99% of both UVA & B obstruction. A quality lens will also strive to reduce glare, add contrast, and yet maintain color balance all to enhance vision. However, other than by limiting all visible light, known lenses do not specifically limit blue light, and this would be a great advantage in light of the AMD correlation.

The foregoing requires a lens with an optimum transmission profile that filters the different colors in proportion to their ability to damage the tissue of the retina, thereby reducing the risks of macular degeneration while actually improving vision. Presently, a number of advancements in lens technology give significant control over the transmission profile of lenses.

Polarization

It is common to provide polarized lenses in sunglasses to eliminate the horizontal transmission of reflected light through the lenses of the glasses to the eyes of the wearer. The polarizing layer blocks light at certain angles, while allowing light to transmit through select angles. This helps to negate annoying glare reflected off other surfaces such as water, snow, automobile windshields, etc. A polarized filter is produced by stretching a thin sheet of polyvinyl alcohol to align the molecular components in parallel rows. The material is passed through an iodine solution, and the iodine molecules likewise align themselves along the rows of polyvinyl alcohol. The sheet of polyvinyl is then applied to the lens with colored rows of iodine oriented vertically in order to eliminate horizontally reflected light. The sheet of polyvinyl may be applied to a lens in one of two ways: the lamination method or the cast-in mold method. To polarize a glass lens, the lamination method is used whereby the polyvinyl filter is sandwiched between two layers of glass. For plastic lenses, the cast-in mold method is used whereby the polyvinyl filter is placed within the lens mold. Relevant prior art patents might be seen in the Schwartz U.S. Pat. No. 3,838,913 and Archambault U.S. Pat. No. 2,813,459. A significant benefit of polarized lenses is the elimination of glare from reflective surfaces such as water.

Color Filters

Color filters can also provide excellent ultraviolet obstruction properties. For example, U.S. Pat. No. 4,952,046 (SunTiger) discloses an optical lens with an amber filter having selective transmissivity functions. This is the original "Blueblocker" patent for amber lenses that substantially eliminates ultraviolet radiation shorter than 515 nm. The lens is substantially transparent to wavelengths greater than 636 nm which are most useful for high visual acuity in a bright sunlit environment. Similarly, U.S. Pat. No. 5,400,175 (SunTiger) discloses an amber filter having a cut-on at 550 nm. However, color-differentiation is highly distorted due to the deep orange tint.

Similarly, PhotoProtective Technologies of San Antonio, Tex. produces lenses having Melanin pigment. These are said to eliminate all the UV (thereby reducing the risks of cataracts); reduce the violet and blue light (to reduce the risks of macular degeneration); and reduce glare.

The value of color filtration is further apparent in U.S. Pat. No. 6,145,984 to Farwig, which discloses a color-enhancing polarized lens with a trichroic contrast enhancer that yields a virtually colorless gray to the eye, and yet improves the areas of color saturation, chromatic and luminous contrast, clarity of detail, depth perception, and haze penetration.

It would be medically valuable to provide a lens that likewise eliminates all the UV light, and also reduces visible blue light to its lowest possible level.

Mirror Coatings

Various mirror coatings have been available to the sunglass industry for decades. These mirror coatings can be applied to the front and/or back surface of a lens to further reduce glare and provide protection against infrared rays. Metallic mirrors comprise a layer of metal deposited directly on a glass lens to create the equivalent of a one-way mirror. U.S. Pat. No. 4,070,097 to Gelber, Robert M (1978). However, most metallic oxide coatings have proven to be very susceptible to scratching and wear, especially near salt water. Salt water tends to degrade such coatings over time. In addition, metallic mirror coatings absorb light and generate heat. The more recent advent of dielectric mirror coatings solve some of the above-referenced problems. For one, dielectric coatings reflect light without absorption, thereby avoiding the discomfort of hot glasses. Moreover, dielectric coatings are more durable than metallic oxide coatings, especially in outdoor coastal environments. For example, a dielectric layer having a medium refractive index, e.g., a mixed TiO2 and SiO2 layer, has been used in a rear view mirror. U.S. Pat. No. 5,267,081 to Pein (1993). Similar titanium and quartz dielectric mirror coatings have been applied to glass lenses. In the context of sunglasses, these dielectric mirror coatings of titanium and quartz prevent salt water damage while providing additional reflection of light. (Titanium Oxide, TiO3 being considered a dielectric material featuring dielectric constant k=20–85, see http://www.semiconductorglossary.com.)

U.S. Pat. Nos. 6,077,569 and 5,846,649 to Knapp et al. suggest a plastic sunglass lens coated with an abrasion resistant material and a dielectric material (including silicon dioxide or titanium oxide). The abrasion-resistant coating layer includes a transparent adhesion layer comprised of C, Si, H, O, and/or N which is deposited by ion-assisted plasma deposition. A second dielectric coating layer is deposited, and a thin metallic mirror layer may be interposed between the abrasion-resistant layer and the dielectric materials to enhance reflectivity and color characteristics. However, the prior art does not teach or suggest how to incorporate a polarizing filter, multi-layer dielectric mirror, and a hydrophobic overcoat in a blue-blocking amber or gray tint lens to provide an outstanding spectroscopic profile, especially for a marine environment.

Hydrophobic Coatings

Hydrophobic coatings are known in a more general context for protecting lens surfaces (U.S. Pat. No. 5,417,744 to Ameron) and for contact lenses (U.S. Pat. No. 4,569,858 to Barnes Hind). Hydrophobic coatings are also appropriate near water to protect underlying layers of a lens over time. Hydrophobic coatings are especially good for protecting mirrored lenses as above. For example, U.S. Pat. No. 5,928,718 to Dillon discloses a protective coating for reflective sunglasses incorporating a conventional resin/polymer type coating for protection of the mirror finish against abrasion and smudging.

Rugate Filters

As an alternative or as a supplement to be used in combination with the above, a Rugate filter is an interference coating in which the refractive index varies continuously in the direction perpendicular to the film plane. The addition of a rugate filter to a lens can block visible blue and UV light, as well as infrared and laser energy, while allowing other visible light to pass unimpeded. Rugate filters are wavelength specific filters that have existed for about a decade. Their simple periodic continuous structures offer a much wider set of spectral responses than discrete structures, and they typically exhibit a spectrum with high reflectivity bands. This allows the possibility of making high reflectivity mirrors with very narrow bandwidth. As an example, Rugate notch filters from Barr Associates use refractory metal oxides for edge filters and beamsplitters. Rugate filters are typically formed by a continuous deposition process, it is an easy matter to vary the mixture deposited on the substrate, and thus vary the index of refraction. An overview of Rugate filter technology can be found at Johnson et al., "Introduction to Rugate Filter Technology" SPIE Vol. 2046, p. 88–108 (November 1993), inclusive of how a simple rugate filter is derived from Fourier analysis. This article shows the utility of refractive index profile tailoring and the advantages of using this technology. Other examples can be found in U.S. Pat. No. 5,258,872 "Optical Filter" by W. E. Johnson, et al. and disclosed in U.S. Pat. No. 5,475,531 "Broadband Rugate Filter" by T. D. Rahminow, et al. Unfortunately it is difficult to manufacture rugate filters as they require expensive vacuum deposition techniques called "sputtering." In the sputtering process it is difficult to accurately control the sputtering of two materials to precisely vary the index of refraction. Other processes such as laser flash evaporation, ion beam assisted deposition, resistive and electron-beam evaporation do not lend themselves to plastic eyeglass lenses and/or require relatively expensive equipment.

It would be greatly advantageous to provide a synergistic combination of UV-absorbing light-weight CR-39™, polarization, and dielectric mirror technology in such a way as to maximize the benefit to watermen. Specifically, it would be advantageous to provide a combination of: a) outer hydrophobic overcoat to protect the lens from seawater and smudging; b) multi-layer dielectric mirror which further reduces light-transmission and glare; and c) two layers of high-contrast ophthalmic CR-39 (plastic) having either a blue-blocking amber-tint or color-discriminating grey tint, d) the layers of CR-39 sandwiching; a cast-in mold polarizing layer, and arranged to provide an unsurpassed light transmission profile optimum for use on the water in which there is 100% absorption of UVA & B light. It would also be advantageous to provide a Rugate filter in place of or as a supplement to the foregoing dielectric mirror to even further reduce the visible blue light as well as infrared and laser energy.

SUMMARY OF THE INVENTION

It is an object of the present invention to provide a sunglass lens specially adapted for use by watermen which adheres a multi-layer dielectric mirror to two layers of ophthalmic CR-39™ (plastic) and/or impact resistant polycarbonate sandwiching a polarizing filter. This combination reduces both glare and overall light transmission.

It is another object to incorporate the multi-layer dielectric mirror with a CR-39™ (plastic) and/or impact resistant polycarbonate lens to further decrease the transmission values of the tinted lens and yet provide outstanding durability characteristics.

It is another object to provide a lens as described above which incorporates the polarizing filter between two-layers of high-contrast blue-blocking amber-tinted ophthalmic CR-39 (plastic) and/or impact resistant polycarbonate to absorb 100% of ultraviolet light and reduce visible blue light transmission to less than 0.5%.

It is another object to provide a lens as described above which incorporates the polarizing filter between two-layers of color-discriminating grey ophthalmic CR-39 (plastic) and/or impact resistant polycarbonate to absorb 100% of ultraviolet light and reduce visible blue light transmission to less than 7%.

It is another object to provide a lens as described above that additionally includes an outer hydrophobic overcoat to protect the inner lens layers from seawater and smudging.

It is another object to provide a lens that incorporates a Rugate filter in place of or as a supplement to the foregoing dielectric mirror to even further reduce the visible blue light as well as infrared and laser energy.

According to the present invention, the above-described and other objects are accomplished by providing an improved ten-layer light-weight CR-39™ or impact resistant polycarbonate, polarized, dielectric-mirrored lens for sunglasses. The lens includes an outer hydrophobic overcoat to protect the inner lens layers from seawater and smudging. Next is a six-layer dielectric mirror which further reduces light transmission. The mirror is bonded to two layers of CR-39 (plastic) or impact resistant polycarbonate; in either amber or grey tint, the foregoing layers sandwiching a polarizing filter for a total of ten layers.

As an option (or as a substitute for the dielectric mirror), the lens may incorporate a Rugate filter.

Superior test results for the above-described lenses (for performance, function and durability) distinguish them from existing lenses and evidence the synergistic relationship of the particular combination of layers.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 2 is a spectral analysis showing the light transmission profile of the improved multi-layer grey sunglass lens for watermen according to the present invention (analysis by Colts Laboratories of Clearwater Fla., a leading and accredited analysis laboratory).

FIG. 2A is a definition analysis showing the definition profile of the improved multi-layer grey sunglass lens for watermen according to the present invention.

FIG. 3 is a spectral analysis showing the light transmission profile of the improved multi-layer grey sunglass lens as above without the dielectric mirror or hydrophobic coating (Colts Labs).

FIG. 4 is a spectral analysis showing the light transmission profile of the improved multi-layer amber sunglass lens for watermen according to the present invention (Colts Labs).

FIG. 4A is a definition analysis showing the definition profile of the improved multi-layer amber sunglass lens for watermen according to the present invention.

FIG. 5 is a spectral analysis showing the light transmission profile of the improved multi-layer amber sunglass lens as above without the dielectric mirror or hydrophobic coating (Colts Labs).

FIG. 6 is a spectral analysis for comparative purposes showing the light transmission profile of competing Ray Ban® sunglass lens (Colts Labs).

FIG. 7 is a spectral analysis for comparative purposes showing the light transmission profile of competing Blu-Blocker® sunglass lens (Colts Labs).

FIG. 8 is a spectral analysis for comparative purposes showing the light transmission profile of competing Costa Del Mar® sunglass lens (Colts Labs).

DETAILED DESCRIPTION OF THE PREFERRED EMBODIMENTS

Disclosed is an improved ten-layer lightweight CR-39™ (plastic) polarized, dielectric mirrored sunglass that gives a light transmission profile in which 100% of UVA & B light absorption occurs in high contrast blue-blocking amber and color-discriminating grey. Either embodiment is optimum for use on the water.

Figure 1:
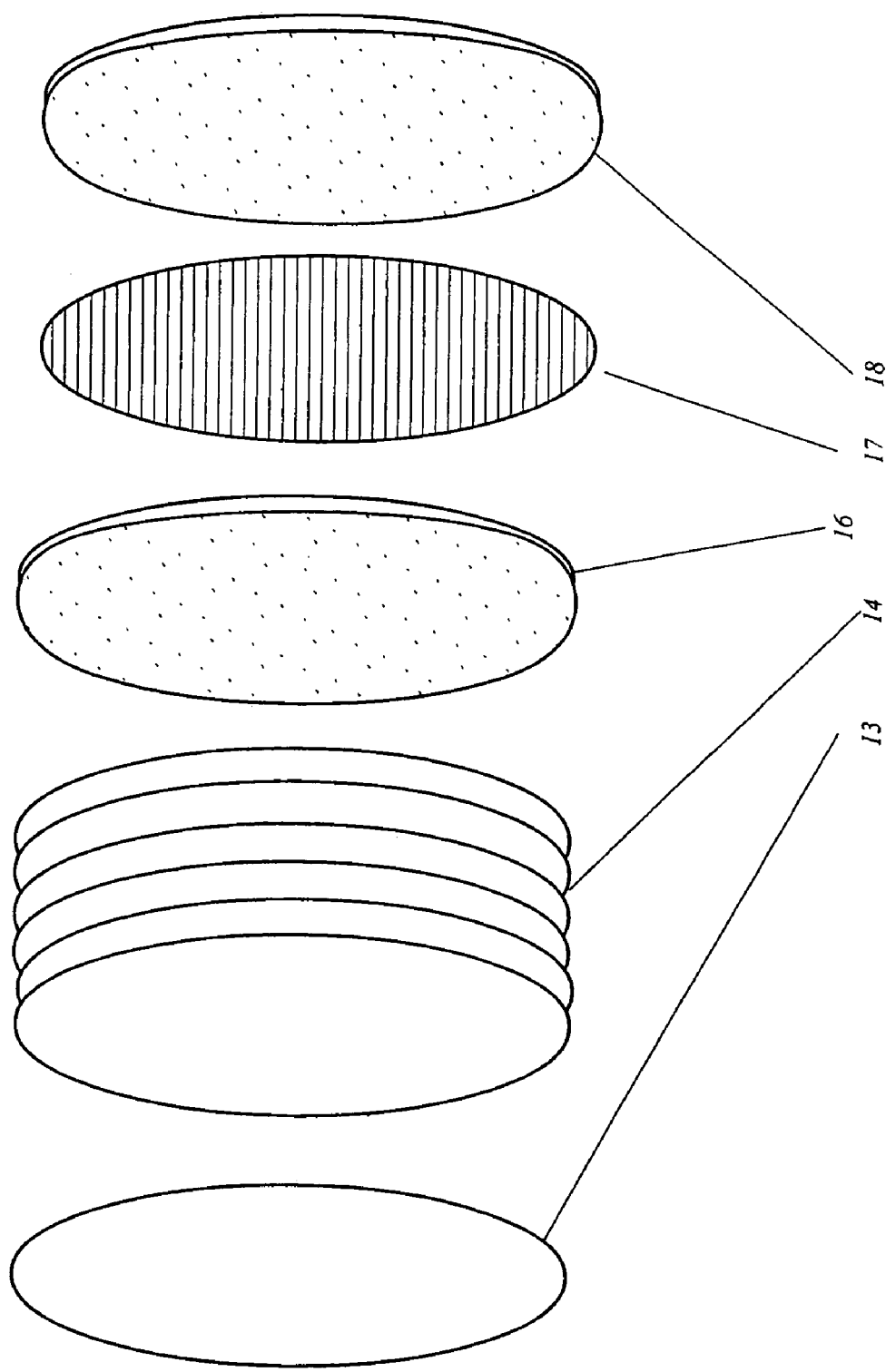
FIG. 1 is a perspective exploded sketch showing the various lens layers according to the present invention.
Figure 9:
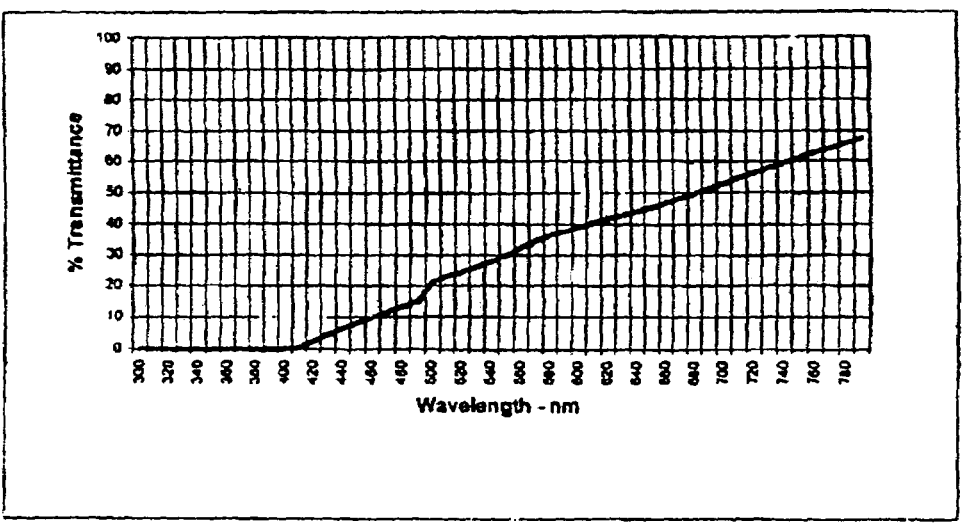
FIG. 9 is a spectral analysis for comparative purposes showing the light transmission profile of competing Melavision® (Photoprotective Technologies) sunglass lens (Colts Labs).

FIG. 1 is a perspective exploded sketch showing the various lens layers according to the present invention. The outermost layer 13 of lens 2 is a hydrophobic overcoat. The hydrophobic coating is preferably a silicon-based chemical coating of known type such as commercially available from OMS, 177108 Canada Inc., 5120 Courtrai, Suite 12, Montréal, Québec, Canada H3W 1A7. This coating 13 may be deposited by known dipping or chemical vapor deposition processes, and it makes the lens water repellant for better vision during rainstorms or water related activities. In addition, hydrophobic overcoat 13 makes the lens easier to clean as contaminants do not adhere to the lubricated lens surface easily. Moreover, the hydrophobic overcoat 13 resists smudging and streaking due to environmental and body contaminants. This hydrophobic layer 13 also produces a sealing effect to protect the lens and other base coatings, and to increases the longevity of the underlying layers. The hydrophobic coating 13 bonds with the lens to create a barrier against dirt, repelling dust, grease and liquid. The coating is non-acidic. It allows the lens to be cleaned with a wiping cloth without cleaning solution. The hydrophobic coating does not optically change the lens properties. It is extremely durable water repellant and not only repels water, but any other undesirable matter, including salt spray. The hydrophobic coating also combats bacterial build-up as dirt and oils do not stay on the lens.

The hydrophobic overcoat 13 is applied directly onto a multi-layered dielectric mirror layer 14. U.S. Pat. No. 5,844,225 to Kimock et al discloses an optical coating design formed in a multi-layer "dielectric stack" configuration for producing an anti-reflection feature, plus a method for fabricating a coated substrate product. Kimock et al. '225 also suggests various stacked layers inclusive of titanium oxide, nitride, zirconium nitride, boron nitride, yttrium oxide, silicon oxide, silicon dioxide, zirconium oxide, silicon carbide, aluminum oxide, aluminum nitride, and various mixtures thereof. The present invention employs a similar method to create a particular stacked layer 14 which actually comprises six equal-thickness thin film layers (2–3 nm total) of titanium oxide, silicon dioxide (quartz), zirconium oxide, and chromium, each thin film layer being vacuum deposited separately in alternating 90 degree angles to provide a reflective mirror finish. Dielectric mirrors in general combine high reflection values with outstanding durability characteristics. These coatings can generally exhibit significantly higher reflectance values than metallic films over specific wavelength intervals. The present stacked dielectric mirror layer 14 with particular constituents applied in alternating angular deposits further optimizes the lens to reduce light transmission through the entire UV and visible light spectrum.

The next three lens layers 16–18 include a polarizing filter layer 17 bonded between two lightweight CR-39 (plastic) or polycarbonate layers 16, 18.

In one embodiment, high-contrast blue-blocking amber CR-39 (plastic) or polycarbonate layers 16, 18 are specifically chosen for their dramatic glare blocking properties which in combination with the dielectric mirror 14 yield the excellent light transmission profile of the present invention.

In an alternate embodiment, ophthalmic grey CR-39 (plastic) or polycarbonate layers 16, 18 are specifically chosen for their superior color-discriminating capability.

Either CR-39 (plastic) or polycarbonate lens blanks may be used as both types of materials are capable of molecular bonding, which is important for the following reasons.

For the polarizing filter layer 17, there are basically two types of polarized lens constructions, laminated and cast suspended filter. Laminated lenses are made by sandwiching the polarized film between layers of plastic or glass, utilizing an adhesive to hold it together. The adhesive can make the laminated lens appear hazy and the adhesion can fail when subjected to high heat and processing forces. The CR-39 polarized lens 16 of the present invention is cast with suspended filter and does not rely upon adhesives to hold everything together. Molecular bonding is used to chemically join the lens layers 16–18, thus totally encapsulating the polarizing filter layer 17 between the two CR-39™ plastic lens layers 16, 18, thereby avoiding haze and delamination.

The combination of the above-described hydrophobic layer 13, dielectric mirror layer 14, and polarizing lens layers 16–18 dramatically reduce glare and increase contrast in varying types of light conditions, and the bonded configuration is most durable for use in a marine environment.

FIG. 2 is a spectral analysis (with data print attached) showing the light transmission profile of the improved multi-layer grey sunglass lens for watermen according to the present invention. The attached spectral analysis was conducted by Colts Laboratories of Clearwater Fla., a leading analysis laboratory that is accredited by the American Association for Laboratory Accreditation to ISO Guide 25 and by the Safety Equipment Institute. It can readily be seen that the light transmission properties of the improved multi-layer sunglass lens are optimized for watermen. Ultraviolet absorption of 100% of UV-A & B light occurs to at least 400 nm, average blue light transmission is 6.84%, and these profiles are optimum for use on the water.

FIG. 2A is a definition analysis showing the definition profile of the improved multi-layer grey sunglass lens for watermen according to the present invention.

The definition analysis is an ANSI standard test for eye and face protective devices and rates the protectiveness of the lens in terms of angular protection and frontal protection. It is noteworthy that this particular ANSI Z87.1 specification is important to waterman because of the rough environment they work in. The ability of the present lens to surpass this impact standard is a salient feature.

FIG. 3 is a spectral analysis (with data print attached) showing the light transmission profile of the improved multi-layer grey sunglass lens as above without the dielectric mirror or hydrophobic coating. It can be seen by comparing FIGS. 2 and 3 that the dielectric mirror layer 14 reduces light transmission by as much as an additional 3–4% percent in the 420–500 nm range (note that there is no increase in UV absorption as with metallic mirror coatings, but only a reduction in transmitted light). The use of a dielectric mirror 14 rather than metallic provides improved glare screening, scratch resistance and overall durability, and it does not absorb light or generate heat. This is ideal for performance water activities, especially in extremely bright daylight conditions.

FIG. 4 is a spectral analysis (with data print attached) showing the light transmission profile of the improved multi-layer amber sunglass lens for watermen according to the present invention. Ultraviolet absorption of 100% occurs to at least 400 nm, average blue light transmission is an unprecedented 0.34%, and these profiles are optimum for use on the water.

FIG. 4A is a definition analysis (similar to FIG. 2A) showing the definition profile of the improved multi-layer amber sunglass lens for watermen according to the present invention.

FIG. 5 is a spectral analysis (with data print attached) showing the light transmission profile of the improved multi-layer amber sunglass lens as above without the dielectric mirror or hydrophobic coating. As before, it can be seen by comparing FIGS. 4 and 5 that the dielectric mirror layer 14 reduces light transmission by an additional 1–3 percent in the 500–600 nm range (again there is no increase in UV absorption as with metallic mirror coatings, but only a reduction in transmitted light). The same additional benefits of improved glare screening, scratch resistance and overall durability are gained.

FIGS. 6–9 are comparative test results with a few exemplary existing lenses. Specifically, FIGS. 6–9 are spectral analyses for comparative purposes showing the light transmission profile of a competing Ray Ban® sunglass lens, BluBlocker® sunglass lens, Costa Del Mar® sunglass lens, and Melavision® sunglass lens, respectively. Comparison with the results for the present lenses as shown in FIGS. 2 and 4 reveals a significant inability on the part of the competitors with regard to average blue light obstruction.

The average blue light filtering ability (% transmission) for the present lenses as compared to the test results of FIGS. 6–9 are as follows:

| Subject Lens | Average Blue Light Transmission (Lower is better) |
| --- | --- |
| Multi-layer amber lens of the present invention | 0.34% (FIG. 4) |
| BluBlocker ® sunglass lens | 0.85% (FIG. 7) |
| Costa Del Mar ® sunglass lens | 2.58% (FIG. 8) |
| Ray Ban ® sunglass lens | 4.90% (FIG. 6) |
| Multi-layer grey lens of the present invention | 6.84% (FIG. 2) |
| Melavision ® sunglass lens | 6.93% (FIG. 9) |

Comparing these results shows a much greater ability on the part of the present amber lens to filter blue light while also reducing glare, adding contrast, and maintaining color balance. Only the BluBlocker lenses approach the same level of effectiveness, however, color discrimination is markedly reduced because of the blu-blocking deep orange coloration. The others increase the risk of photochemical retinal damage as described earlier. Therefore, the present invention outperforms all others with regard to preserving ocular physiological integrity (UV-A & B light is absorbed to higher wavelengths, and more visible blue light is filtered), and yet a balanced light transmission profile is maintained for better visual acuity.

Figure 10:
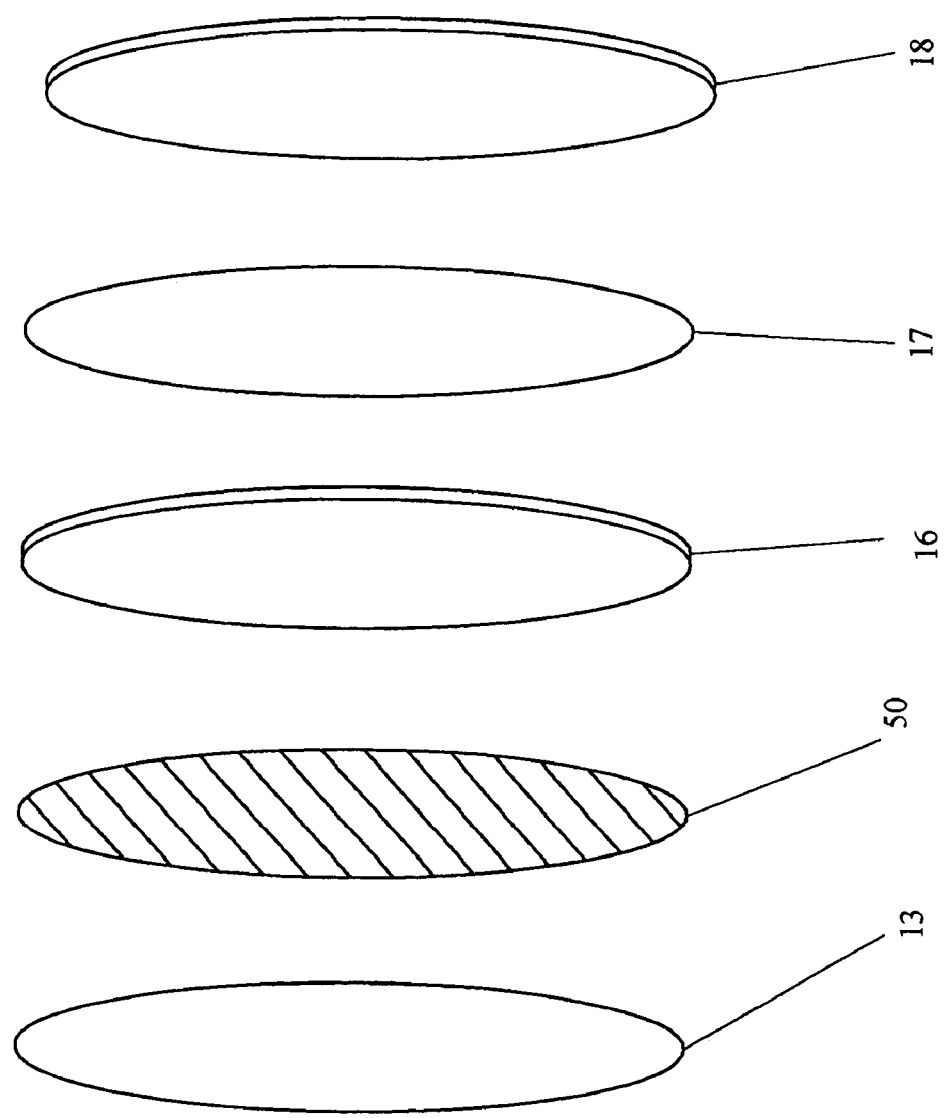
FIG. 10 is a perspective exploded sketch showing the various lens layers according to another embodiment of the present invention in which a Rugate filter 50 is incorporated in place of the multi-layered dielectric mirror layer 14 of FIG. 1.

The present invention also contemplates the use of a Rugate filter in place of or as a supplement to the foregoing dielectric mirror to even further reduce the visible blue light as well as infrared and laser energy. While more expensive to produce, Rugate filters are effective bandpass filters that can be made to exhibit the same light transmission profile. Referring to FIG. 10, a Rugate filter 50 may be incorporated in place of the multi-layered dielectric mirror layer 14 of FIG. 1. Alternatively, the Rugate filter may be deposited directly on the multi-layered dielectric mirror layer 14 as a supplement thereto. The Rugate coating 50 may be a combination of Silicon, Oxygen and Nitrogen compounds in specific ratios providing a pre-defined variation in the index of refraction. For example, Silicon Dioxide ($SiO_2$) provides an index of refraction of about 1.5 while Silicon Nitride ($Si_3N_4$) provides a value of about 2.0. For present purposes, the variation in the index of refraction is calculated in order to complement or supplement the above-described dielectric mirror, e.g., by further reducing the visible blue light as well as infrared and laser energy. It should be noted that other combinations can be used to achieve this desired light transmission profile. For example, tantala/silica and hafnia/silica combinations have been used for multilayer coatings in the UV-A and UV-B spectral range, and layers of silica and alumina have been used in the UV-B and UV-C region. These materials are deposited by means of a plasma-enhanced chemical vapor deposition process (PECVD) varying the flow rate of Ammonia gas ($NH_3$) and Nitrous Oxide gas ($NO_2$) in the presence of a mixture of Silane gas ($SiH_4$) and Argon, though it should be understood that other combination of materials can be used. See, for example, Goetzelmann et al., "Uv Coatings Produced with Plasma-ion-assisted Deposition", SPIE Vol. 3738, p. 48–57 (September 1999), which describes the plasma-ion-assisted deposition for the production of multilayer coatings for the visible and NIR spectral range including rugate filters.

The Rugate filter is deposited on one of the lens layers 16–18 via plasma-enhanced chemical vapor deposition using a vacuum chamber in which, for example, lens layer 16 is placed with the rugate filter coating 50 deposited thereon by a traditional evaporation method. The coating 50 is deposited on the lens layer 16 using an increment deposition approach, and this can be implemented by computer control to achieve the desired sinusoidal Rugate profile. Plasma-assist coating then relies on plasma to bombard the thin Rugate film deposited by the traditional evaporation method in order to improve the film's micro-structure. In this type, the main chamber of a vacuum system is maintained at a residual pressure around 10 mil by an inert, ionized sputter-gas (for example, argon) called a plasma. An RF generator generates the plasma within the chamber, and the flow of process gases are controlled by a computer in a known manner. Plasma sputtering generally needs a certain concentration of gas molecules, typically 1 to 10 millitorr of residual pressure, to operate. This results in a single layer Rugate film 50 having a continuously varying index of refraction along a thickness direction with a number of maxima and minima in the index. The variation in the index of refraction may be calculated in a known manner to provide a Rugate filter 50 in place of or as a supplement to the foregoing dielectric mirror to further preserve visual integrity while also reducing glare, adding contrast, and maintaining color balance. Preferably, the Rugate filter used herein is color-neutral so as not to alter the light transmission profile of the other lens layers. See, for example, Johnson et al., "Color Neutral Rugate Filters", SPIE Vol. 2046, p. 132–140 (November 1993), which describes a transmissive rugate filter which is designed to reflect a portion of the visible spectrum and yet not appear to have a dominant color.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A sunglass lens, comprising:
   a multilayer dielectric mirror for reducing glare and overall light transmission, said dielectric mirror comprising six thin film layers;
   a first layer of ophthalmic plastic colorized with color discriminating grey tint;
   a second layer of ophthalmic plastic colorized with said color discriminating grey tint;
   a polarizing layer encapsulated between said first and second ophthalmic plastic layers;
   whereby said layers are arranged to provide a balanced light transmission profile in which substantially 100% of UV-A & B light is blocked to at least 400 nm, and average blue light transmission of said lens is less than 0.4%.

2. The sunglass lens according to claim 1, wherein said first and second layers are CR-39™ plastic.

3. The sunglass lens according to claim 1, wherein said first and second layers are polycarbonate.

4. The sunglass lens according to claim 1, wherein said polarizing filter layer is molecularly bonded between said first and second ophthalmic plastic layers to avoid haze and delamination.

5. A sunglass lens, comprising:
   a first layer hydrophobic overcoat for protection from seawater and smudging;
   a second layer dielectric mirror for reducing light transmission and glare, said dielectric mirror comprising six thin film layers;
   a third layer color discriminating grey-tinted ophthalmic plastic material;
   a fifth layer color discriminating grey-tinted ophthalmic plastic material;
   a fourth polarizing layer molecularly bonded to said third and fifth plastic layers and sandwiched there between to avoid haze and delamination;
   whereby said layers are arranged to provide a balanced light transmission profile optimum for use on the water in which at least 99.94% of UV-A & B light is blocked to at least 400 nm and average blue light transmission is 6.84%.

6. The sunglass lens according to claim 5, wherein said third and fifth ophthalmic plastic layers are CR-39™ plastic.

7. The sunglass lens according to claim 5, wherein said third and fifth ophthalmic layers are polycarbonate.

8. A sunglass lens, comprising:
   a first layer hydrophobic overcoat for protection from seawater and smudging;
   a second layer dielectric mirror for further reducing light transmission and enhancing UV obstruction;
   a third layer color-discriminating grey-tinted ophthalmic CR-39™ plastic;
   a fourth polarizing layer;
   a fifth layer color-discriminating grey-tinted ophthalmic CR-39™ plastic;
   whereby said layers are arranged to provide a balanced light transmission profile optimum for use on the water in which at least 99.94% of UV-A & B light is blocked to at least 400 nm and average blue light transmission is 6.84%.

9. The sunglass lens according to claim 8, wherein said second layer dielectric mirror further comprises a multi-layered dielectric mirror.

10. The sunglass lens according to claim 9, wherein said second layer multi-layered dielectric mirror further comprises at least six thin film layers vacuum deposited atop said third layer for further reducing light transmission and glare.

11. The sunglass lens according to claim 10, wherein said fourth polarizing layer is molecularly bonded between said third and fifth CR-39™ lenses to avoid haze and delamination.

* * * * *